(12) United States Patent
Frick et al.

(10) Patent No.: US 7,511,097 B2
(45) Date of Patent: Mar. 31, 2009

(54) TWO-COMPONENT ADHESIVE OF EPOXY RESINS AND AMINE COMPOUND

(75) Inventors: Karsten Frick, Aargau (CH); Andreas Lutz, Schwyz (CH); Isabell Wipf, Holderstock Sins (CH)

(73) Assignee: Dow Global Technologies, Inc., Midland, MI (US)

( * ) Notice: Subject to any disclaimer, the term of this patent is extended or adjusted under 35 U.S.C. 154(b) by 356 days.

(21) Appl. No.: 11/363,692

(22) Filed: Feb. 28, 2006

(65) Prior Publication Data

US 2006/0205897 A1     Sep. 14, 2006

(30) Foreign Application Priority Data

Feb. 28, 2005   (EP) ................. 05004304

(51) Int. Cl.
   *C08L 63/02*     (2006.01)
(52) U.S. Cl. ............... 525/113; 523/428; 523/429; 525/524; 525/526
(58) Field of Classification Search ............ None
   See application file for complete search history.

(56) References Cited

U.S. PATENT DOCUMENTS

| | | | |
|---|---|---|---|
| 4,278,737 | A | 7/1981 | Creffield et al. |
| 4,476,285 | A | 10/1984 | Crabtree |
| 4,659,779 | A | 4/1987 | Bagga et al. |
| 4,739,019 | A | 4/1988 | Schappert et al. |
| 4,916,187 | A | 4/1990 | Goel |
| 5,073,601 | A | 12/1991 | Mülhaupt et al. |
| 5,194,502 | A | 3/1993 | Saito et al. |
| 5,278,257 | A | 1/1994 | Mülhaupt et al. |
| 5,308,895 | A | 5/1994 | Gan et al. |
| 5,629,380 | A | 5/1997 | Baldwin et al. |
| 6,248,204 | B1 | 6/2001 | Schuft |
| 6,572,971 | B2 * | 6/2003 | Martin ............... 428/414 |
| 6,645,341 | B1 * | 11/2003 | Gordon ............... 156/330 |
| 6,776,869 | B1 * | 8/2004 | Schenkel ............ 156/331.7 |
| 2002/0164485 | A1 | 11/2002 | Martin |
| 2003/0124037 | A1 | 7/2003 | Voss et al. |
| 2004/0266899 | A1 | 12/2004 | Muenz et al. |
| 2005/0070634 | A1* | 3/2005 | Lutz et al. ............ 523/427 |
| 2005/0159511 | A1 | 7/2005 | Kramer |
| 2005/0209401 | A1* | 9/2005 | Lutz et al. ............ 525/113 |
| 2006/0276601 | A1 | 12/2006 | Lutz et al. |

FOREIGN PATENT DOCUMENTS

| | | | |
|---|---|---|---|
| DE | 4318467 A1 | * | 12/1994 |
| GB | 1484797 A | * | 9/1977 |
| JP | 2000-239637 A | * | 9/2000 |
| WO | WO 03/054069 | | 7/2003 |
| WO | WO 2005/007766 | | 1/2005 |
| WO | WO 2005/118734 | | 12/2005 |

OTHER PUBLICATIONS

"Modification of epoxy coatings," Polymers Paint Colour Journal, vol. 187, No. 4393, 1997 and HCAPLUS accession No. 1997:519690, two pages.*
HCAPLUS accession No. 1995:710350 for Zhang et al., "Moderate-temperature-curable two-component epoxy resin," Zhongguo Jiaonianji, vol. 4, No. 3, 1995, one page.*
HCAPLUS accession No. 1963:9656 for Great Britain Patent No. 904,403, Reinking, Aug. 29, 1962, one page.*
CAS regsitry No. 461-58-5 for dicyandiamide, 1967, two pages.*
Dr. Rolf Muelhaupt et al., Modified Epoxy Resins, EP0338985B1, May 18, 1994, Ciba Geigy AG, MPI Family Report.
Raytheon Company, XP-002307834, Polyepoxide Adhesive Screen Print IC Contain React Plasticised Thermoconducting Fill, AN-1991-151142, JP3043481, Feb. 25, 1991.
Database WPI Section Ch, Week, 199121, Derwent Publications Ltd., London, GB; AN 1991-151142, XP002307834 & JP 03043481 Raytheon Co., Feb. 25, 1991-Abstract.
JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.

* cited by examiner

*Primary Examiner*—Robert Sellers (57) ABSTRACT

The present invention relates to a two-component epoxy adhesive composition comprising
a) a first component comprising a first epoxy resin and a second epoxy resin, the second epoxy resin being flexibilized by an elastomer, and
b) a second component comprising at least one amine compound with one or more primary and/or secondary amino groups, said amine compound having a molecular weight of less than 450 g/mol.

The ratio of the total number of amino groups of the amine compound to the total number of epoxy groups of the epoxy resins is 0.01:1 to 0.5:1. The mixing of the two components a) and b) results in a wash-off resistant composition. Said wash-off resistant composition results upon heat-curing in a crash-stable structural adhesive.

13 Claims, 7 Drawing Sheets

TWO-COMPONENT ADHESIVE OF EPOXY RESINS AND AMINE COMPOUND

FIELD OF INVENTION

The present invention relates to a two-component epoxy adhesive composition, a wash-off resistant epoxy adhesive composition obtainable by mixing the two components, a process for bonding together at least two surfaces and parts bonded together by the epoxy adhesive composition. The invention further relates to the use of a two-component epoxy adhesive composition for bonding together oily metal surfaces and for bonding together parts of a vehicle into a crash-stable assembly. It also relates to the use of an amine compound as a reactive agent in an epoxy adhesive composition.

BACKGROUND OF INVENTION

Epoxy adhesive compositions are reaction adhesive compositions comprising an epoxy resin, a curing agent and usually a latent accelerator. Upon heating, the epoxy groups of the epoxy resin react with the curing agent linking the epoxy resin compounds by a polyaddition reaction to obtain a cured product.

Such a cured product is known to have good mechanical properties and a corrosion resistance superior to the cured product of other reaction adhesives. These characteristics make epoxy based adhesive compositions particularly useful for demanding applications where stringent mechanical requirements must be satisfied, for example, in the automotive industry. Adhesives for bonding parts of the body structure of a vehicle, for example, a car, a lorry (truck), a bus or a train, are called structural adhesives.

Generally, heat-curable epoxy adhesives are used as structural adhesives.

In the manufacturing process of a vehicle, the heat-curable structural adhesive which has been applied to the body-in-white structure is subjected to spray-wash or other cleaning methods followed by phosphatizing and e-coating prior to the final heat-curing of the structural adhesive in the e-coat oven. In order to prevent the heat-curable structural adhesive from being washed off, it is conventionally pre-cured by thermal methods such as inductive pre-curing or by using a body-in-white oven. However, such an additional pre-curing step makes the manufacturing process laborious. Additionally, body-in-white ovens are expensive.

As an alternative to the heat-curable epoxy adhesives, the use of two-component epoxy adhesives as structural adhesives has been considered. Two-component epoxy adhesives comprise two separate components, the first comprising the epoxy resin and the second comprising the epoxy reactive compound. Such two-component epoxy adhesives generally cure immediately after mixing the two components and do not require the equipment used for the pre-curing and the curing of heat-curable epoxy adhesives.

A number of two-component epoxy adhesives have been described in the past.

U.S. Pat. No. 4,728,737 discloses a two-component structural adhesive comprising an epoxy resin component and a hardener component (incorporated herein by reference).

U.S. Pat. No. 4,916,187 relates to a two-component epoxy resin adhesive composition consisting of a first polyepoxide component and a second curing component comprising a finely dispersed solid salt of a polyamine and a polyphenol in a liquid adduct (incorporated herein by reference).

U.S. Pat. No. 5,629,380 discloses a two-component epoxy adhesive comprising a first component including an epoxy catalyst and an amine curing agent and a second component including an epoxy resin having a functionality of more than 1 (incorporated herein by reference).

US 2002/0164485 and U.S. Pat. No. 6,577,971 both relate to a two-component epoxy adhesive composition comprising a first component including an epoxy resin and a silane coupling agent and a second component including an aliphatic amine and a polyamine (incorporated herein by reference).

U.S. Pat. No. 6,248,204 discloses a room-temperature curable epoxy resin composition comprising a first component including an epoxy resin and a second component including an amine-based hardener (incorporated herein by reference).

The above-mentioned compositions have however several disadvantages which limit their use as structural adhesives. Their pot life, i.e., the time available for using the epoxy adhesive composition after the components are mixed, is short since the curing starts at room temperature immediately after mixing. Thus, the assembly of the parts to be bonded together has to be carried out shortly after application of the epoxy adhesive. In addition, said two-component epoxy adhesive compositions lead to cured products which do not meet the requirements generally demanded of structural adhesives. In particular, the crash stability of the cured product of said two-component epoxy adhesives does not comply with the stringent requirements for this application. Generally, the glass transition temperature of a cured two-component epoxy adhesive is low. Their oil uptake is poor which is particularly disadvantageous in the manufacture of vehicles where oily steels are bonded together.

The object of the present invention is to provide a two-component structural adhesive which is wash-off resistant without thermal pre-curing, which has an assembly time of several hours, can be stored in the uncured state up to several weeks and which results in a cured product having a high crash stability, a high glass transition point and a good oil uptake.

SUMMARY OF INVENTION

This object has been achieved by a two-component epoxy adhesive composition comprising:
a) a first component comprising a first epoxy resin and a second epoxy resin, the second epoxy resin being flexibilized by an elastomer, and
b) a second component comprising at least one amine compound with one or more primary and/or secondary amino groups, said amine compound having a molecular weight of less than about 450 g/mol,
wherein the ratio of the total number of amino groups of the amine compound to the total number of epoxy groups of the epoxy resins is about 0.01:1 to about 0.5:1 and the mixing of the two components a) and b) results in a wash-off resistant composition, said wash-off resistant composition resulting upon heat-curing in a crash-stable structural adhesive.

The amine compound in component b) acts as a reactive agent leading to wash-off resistance. After mixing the two components, the viscosity of the epoxy adhesive composition increases from a value less than about 1,000 Pa·s to a plateau of a substantially constant value of at least about 2,000 Pa·s (at 23° C. and at a shear rate of 0.01) due to the reaction of the epoxy resins with the amine compound. Such a pre-reacted composition, i.e., a non-fully cured composition having a higher viscosity than the individual components, is wash-off resistant. Consequently, the epoxy adhesive composition applied to the body-in-white structure is not washed off when subjected to spray-wash or other cleaning methods.

The duration between the mixing of the two components and the build-up of the wash-off resistance varies in the range of about 30 minutes to about 24 hours, depending on the amount of amine compound in the composition. Thus, by choosing an appropriate amount of amine compound in the composition resulting in a late build-up of the wash-off resistance, two surfaces can be bonded together long after application of the epoxy adhesive thereon, allowing the application of the adhesive and the actual assembly at distant manufacturing sites.

DETAILED DESCRIPTION OF THE INVENTION

After the applied epoxy adhesive has established the wash-off resistance, it remains in a pre-reacted state. The pre-reacted epoxy adhesive composition of the present invention shows a very low humidity sensitivity. It has a very long open time of up to about 4 weeks at 23° C. and 50 percent relative humidity.

Optionally, pre-curing methods such as inductive pre-curing can be applied to accelerate or enhance the pre-reaction.

In order to obtain a cured product having the desired properties, the epoxy adhesive composition is subjected to a final curing step by heating it to a temperature of at least about 120° C., preferably above about 140° C. for at least about 10 minutes and preferably at least about 20 minutes. After the final curing, the epoxy adhesive composition of the present invention shows all the properties of an excellent structural adhesive. In particular, its lap shear strength and impact peel strength is higher compared to the ones resulting of conventional two-component structural adhesives. Accordingly, the crash stability of the cured epoxy adhesive of the present invention is vastly improved.

Preferably, the adhesive upon cure demonstrates an impact peel strength on steel of about at least 20 N/mm or greater, more preferably from about 25 to about 50 N/mm, when tested according to ISO 11343 on 1 mm cold rolled steel (CRS), e.g., 1403 type.

Its glass transition temperature is higher than about 80° C. In addition, the epoxy adhesive composition of the present invention has a better oil uptake compared to the conventional two-component epoxy adhesives. This is of particular importance in the manufacture of vehicles where oily metal surfaces are bonded together. When heating the epoxy adhesive composition in the final curing step, it softens and effectively takes up the remaining oil on the surface to be bonded. Preferably, the first epoxy resin is a rigid epoxy resin. Epoxy resins which may be employed in the compositions of the invention are those which contain groups illustrated in the following formula wherein $R^8$ is hydrogen or $C_{1-4}$ alkyl, preferably hydrogen or methyl and most preferably hydrogen. As used herein, rigid epoxy resins refer to epoxy resins having bisphenol moieties in the backbone of the epoxy resin. Representative of preferred bisphenol resins useful in this invention are those disclosed in U.S. Pat. No. 5,308,895 at column 8, line 6 and represented by Formula 6. Relevant portions of such patent are incorporated herein by reference. Preferably, the rigid epoxy resin is a liquid epoxy resin or a mixture of a solid epoxy resin dispersed in a liquid epoxy resin. The most preferred rigid epoxy resins are bisphenol and bisphenol-F A based resins. The first epoxy resin preferably can be a liquid epoxy resin, such as D.E.R.™ 330 and D.E.R.™ 331 Bisphenol A based epoxy resins (available from The Dow Chemical Company), or a solid epoxy resin, such as Bisphenol A based epoxy resin D.E.R.™ 671 (available from The Dow Chemical Company), or a mixture thereof.

The second epoxy resin is generally flexibilized by known flexibilization techniques which are for example described in EP-A-1,359,202 and U.S. 2005/159511 (incorporated herein by reference). It can for example be an epoxy resin flexibilized by an acrylonitrile-butadiene copolymer, such as STRUKTOL™ 3604 (available from Schill+Seilacher).

The amine compound with one or more primary and/or secondary amino groups may be chosen from aliphatic or cycloaliphatic di- or polyamines including polyether di- and polyamines as well as polyimines. In a preferred embodiment, the amine compound is selected from the group consisting of 4,7,10-trioxatridecan-1,13-diamine, diethylenetriamine, triethylenetetramine, tetraethylenepentamine, aminoethylpiperazine as well as polyetherdiamines and polyethertriamines, e.g,. of the JEFFAMINE™ polyetherpolyamine type (available from Huntsman Corporation).

In a further preferred embodiment, the first and the second component have a viscosity of less than about 1,000 Pa·s at 23° C. and at a shear rate of 0.01, allowing the two components to be mixed easily and the epoxy adhesive composition to be applied to the substrate by conventional methods, such as bead application by a robot or manual application out of cartridges.

Preferably, at least one of the two components a) and b) further comprises a toughener. More preferably, the toughener is selected from the group consisting of compounds of Formula I

(I)

wherein m is 1 or 2, n is 2 to 6, $R^1$ is an n-valent radical of an elastomeric prepolymer after the removal of the terminal isocyanate, amino or hydroxyl group, the elastomeric prepolymer being soluble or dispersible in epoxy resin, W and X are independently —O— or —$NR^3$—, at least one of W and X being —$NR^3$—, $R^2$ is an m+1-valent radical of a polyphenol or aminophenol after the removal of the phenolic hydroxyl group and optionally of the amino group, and $R^3$ is hydrogen, a $C_1$-$C_6$ alkyl or phenol, and compounds of Formula II (II)

wherein p is 1 or 2, q is 2 to 6, Y is —O—, —S— or —$NR^6$—, Z is a radical selected from the group consisting of —OH, —$NHR^6$, —OCN, $R^4$ is a residue of a hydroxyl-, mercapto- or amino-terminated polyether prepolymer or of a hydroxyl-, mercapto- or amino-terminated prepolymeric, segmented polyester, polythioester or polyamid, $R^5$ is a carbocyclic aromatic or araliphatic p+1-valent radical with groups Z bonded directly to the aromatic ring, $R^6$ is hydrogen, $C_1$-$C_6$ alkyl or phenyl, and $R^7$ is methyl or hydrogen. The composition can comprise a mixture of both a toughener of Formula I and a toughener of Formula II.

A detailed description of the toughener of Formula I is given in EP-A-0,308,664 (page 5, line 14, to page 13, line 24), U.S. Pat. No. 5,278,257 at column 2, lines 14 to 32 and column 4, lines 19 to 31, and column 4, line 57, column 16, line 18 and Examples 1 to 6, column 20, lines 40 to 68), the disclosures of which are (incorporated herein by reference). A detailed description of the toughener of Formula II is given in EP-A-0,353,190 (page 3, line 51, to page 6, line 62), (U.S. Pat. No. 5,073,601, column 1, line 59 to column 2, line 16, column 3, line 60 to column 9, line 21 and U.S. 2005/0760634, paragraphs 0014 to 0053), the disclosures of which are (incorporated herein by reference). Examples of the toughener are FLEXIBILIZER™ DY 965 (prepared as described in Example 13 of EP 308,664 incorporated herein by reference) and DY 3333 (toughener B described in U.S. Patent Publication 2005/070634, paragraphs 0074 and 0075, incorporated herein by reference. Other examples of the toughener are "toughener A" and "toughener C" described in international patent application WO 2005/007766 (U.S. 2005/070634, paragraphs 0072-0073 and 0076-0077 (incorporated herein by reference).

According to a preferred embodiment, the elastomer flexibilizing the second epoxy resin is an acrylonitrile-butadiene rubber.

In a further preferred embodiment, at least one of the two components a) and b) comprises a latent hardener in a total amount of less than 10 weight percent based on the total weight of the composition. A latent hardener is a compound which is inactive at room temperature but acts as a curing agent at elevated temperatures. Preferred latent hardness are described in EP 197,892 (U.S. Pat. No. 4,659,779 at column 4, lines 17 to 34 and U.S. Patent Publication 2005/070,634, paragraph 62 (incorporated herein by reference). Most preferably, the latent hardener is dicyandiamide.

It is further preferred that the second component b) comprises a hydrophobic diluent. The hydrophobic diluent preferably has a boiling point of at least 200° C. more preferably at least 220° C. and most preferably at least 250° C. This allows to further adjust the viscosity of component b) as desired.

Preferably, the hydrophobic diluent is a hydrocarbon based material. Preferably, it is liquid at room temperature (23° C.). More preferably, an aromatic alkyl substituted aromatic for instance, alkyl substituted naphthalene. Among more preferred diluents are diisopropyl naphthalene and triisopropyl naphthalene.

Preferably, at least one of the two components a) and b) comprises one or more additives selected from the group of latent accelerators, adhesion promoters, epoxy silane, fumed silica, wetting agents and inorganic fillers, such as calcium oxide, calcium carbonate, wollastonite or talcum.

In a further preferred embodiment, at least one of the two components a) and b) comprises at least one tertiary mono- or polyamine or a mixture thereof as accelerator. The term "polyamine" includes diamine. Due to the accelerator, an initial green strength, i.e., a strength above about 0.2 MPa, is achieved within hours after mixing the two components. Preferred amine accelerators are described in WO 2005/07,766, page 15, lines 29 to 32 and U.S. 2005/070,634 at paragraph 65 (incorporated herein by reference). An example of such an accelerator is 2,4,6-tris(dimethylaminomethyl)phenol.

If the mono- or polyamine is comprised in component a), it is embedded in a polymer matrix as disclosed in EP 197,892 (U.S. Pat. No. 4,659,779, column 2, lines 39 to 57 and column 4, line 34 to column 6, line 51, incorporated herein by reference). An example of such an embedded polyamine is EP 796 as disclosed in European Patent No. EP-B-0,197,892 (U.S. Pat. No. 4,659,779 (incorporated herein by reference).

According to a preferred embodiment, the weight ratio of the first component a) to the second component b) is from about 2:1 to about 10:1 and the ratio of the total number of amino groups of the amine compound to the total number of epoxy groups of the epoxy resins is from about 0.06:1 to about 0.2:1.

In such an embodiment, it is preferred that:
a) the first component comprises about 30 to about 80 weight percent of the first epoxy resin, about 5 to about 30 weight percent of the second epoxy resin and about 20 weight percent or less of the toughener,
b) the second component comprises about 1 to about 40 weight percent of the amine compound, about 10 to about 80 weight percent of the toughener and about 10 to about 30 weight percent of the hydrophobic diluent, and at least one of the two components a) and b) comprises an inorganic filler, epoxy silane, a wetting agent, fumed silica, a latent hardener, a latent accelerator or a mixture thereof.

The two-component epoxy adhesive of the present invention is particularly well suited for bonding together oily metal surfaces due to its high oil uptake.

It is preferably used for bonding together parts of a vehicle, such as a car, a van, a lorry (truck), a bus and a train, i.e., as structural adhesive. It can also be used for assembling parts of boats and aircrafts.

The present invention further relates to a wash-off resistant epoxy adhesive composition obtainable by mixing the first component a) and the second component b) of the above described two-component epoxy adhesive composition. The mixed composition becomes sufficiently precured to be wash-off resistant after about one hour to several days, preferably about 1 hour to about 24 hours. The premixed adhesive is preferably contacted with the substrates immediately after mixing and preferably no more than 20 minutes, more preferably no more than 10 minutes after mixing.

It also relates to a wash-off resistant epoxy adhesive composition obtainable by mixing the first component a) and the second component b) of the above described two-component epoxy adhesive composition and pre-curing the resulting mixture by thermal methods.

In a process for bonding together separate surfaces, component a) and component b) of the above described two-component epoxy adhesive composition are mixed, the resulting mixture is applied to at least one surface, the surfaces are brought together and the epoxy adhesive composition between the surfaces is cured at a temperature above about 120° C., preferably above about 140° C. for at least about 10 minutes and preferably at least about 20 minutes. Preferably, the curing is performed at about 200° C. or less.

In such a process, the epoxy adhesive composition can be cured up to about 4 weeks after bringing together the surfaces.

The present invention also relates to the use of the two-component epoxy adhesive composition for bonding together parts of a vehicle into a crash-stable assembly. Accordingly, the present invention also relates to parts bonded together by the two-component epoxy adhesive composition into a crash-stable assembly.

EXAMPLES

In the following, examples for the preparation of components a) and b) of the two-component epoxy adhesive composition of the present invention are given.

Component a)

As an example of component a), component A1 has been prepared as follows:

14.1 weight percent of a nitrile-rubber modified epoxy resin (STRUKTOL™ 3604 modified epoxy resin available from Schill+Seilacher), 48.6 weight percent of a liquid epoxy resin (D.E.R™ 330 epoxy resin available from The Dow Chemical Company), 10.1 weight percent of solid epoxy resin (D.E.R.™ 671 epoxy resin available from The Dow Chemical Company), 1.5 weight percent of neo-decanoic acid glycidyl ester, 1 weight percent of a polymeric epoxy silane, (SILQUEST™ A187 available from GE Silicones) and 12.1 weight percent of a toughener (RAM™ 965 toughener available from Huntsman Corporation) were mixed for 30 minutes under vacuum. After cooling to 25° C., 6.8 weight percent of a surface-modified $SiO_2$ (AEROSIL™ fumed silica available from Degussa Corporation) were added and the reaction mixture is carefully mixed under vacuum. Finally, 1 weight percent of a blocked aliphatic amine (ANCAMINE™2441 blocked amine available from Air-Products) and 4.7 weight percent of dicyandiamide were added and the reaction mixture was mixed thoroughly for about 15 minutes under vacuum. Component A2 has been prepared according to the procedure described for A1, but by using 14.0 weight percent of STRUKTOL™3604 modified epoxy resin, 58.2 weight percent of D.E.R™ 330 epoxy resin, 1.5 weight percent of neo-decanoic acid glycidyl ester, 1.0 weight percent of SILQUEST™ A187, 12.0 weight percent of RAM™ 965 toughener, 6.8 weight percent of AEROSIL™ fumed silica, 1.0 weight percent of ANCAMINE™ 2441 blocked amine and 5.5 weight percent of dicyandiamide. Component A3 has been prepared according to the procedure described for A1, but by using 13.2 weight percent of STRUKTOL™3604 modified epoxy resin, 54.7 weight percent of D.E.R™ 330 epoxy resin, 1.4 weight percent of neo-decanoic acid glycidyl ester, 0.9 weight percent of SILQUEST™ A187, 11.3 weight percent of RAM™ 965 toughener, 6.4 weight percent of AEROSIL™ fumed silica, 0.9 weight percent of ANCAMINE™ 2441 blocked amine and 5.2 weight percent of dicyandiamide. Additionally, 6.0 weight percent of CaO has been added. Component A4 has been prepared according to the procedure described for A1, but by using 17.0 weight percent of STRUKTOL™ 3604 modified epoxy resin, 70.5 weight percent of D.E.R™ 330 epoxy resin, 1.8 weight percent of neo-decanoic acid glycidyl ester, 1.2 weight percent, 8.3 weight percent AEROSIL™ fumed silica and 1.2 weight percent of ANCAMINE™2441 blocked amine. Component A5 has been prepared according to the procedure described for A1, but by using 17.2 weight percent of STRUKTOL™3604 modified epoxy resin, 69.2 weight percent of D.E.R™ 330 epoxy resin, 1.7 weight percent of neo-decanoic acid glycidyl ester, 1.0 weight percent, 5.2 weight percent of AEROSIL™ silicon oxide and 5.2 weight percent of dicyandiamide.

Component b)

As an example of component b), component B1 of the two-component epoxy adhesive has been prepared as follows:

57 weight percent of RAM™ 965 toughener, 20 weight percent 4,7,10-trioxatridecan-1,13-diamine and 21 weight percent diisopropylnaphthalene were mixed at 40° C. under vacuum for 30 minutes. The mixture was cooled to 25° C. before adding 2 weight percent of surface-modified $SiO_2$ and AEROSIL™ fumed silica. Finally the formulation was mixed for another 15 minutes under vacuum. Component B2 has been prepared according to the procedure described for B1, but by using 21 weight percent of a mixture of tri- and tetraisopropylnaphthalene instead of diisopropylnaphthalene. Component B3 has been prepared according to the procedure described for B1, but by using 47.1 weight percent of RAM™ 965 toughener, 14.9 weight percent of dicyandiamide, 1.6 weight percent of AEROSIL™ silicon oxide, 12.0 weight percent of CaO, 5.4 weight percent of trioxatridecandiamine, and 17.9 weight percent of a mixture of tri- and tetraisopropylnaphthalene. Component B4 has been prepared according to the procedure described for B1, but by using 44.4 weight percent of RAM™ 965 toughener, 14.8 weight percent of dicyandiamide, 1.6 weight percent of AEROSIL™ fumed silica, 11.3 weight percent of CaO, 10.0 weight percent of trioxatridecandiamine, and 19.0 weight percent of a mixture of tri- and tetraisopropylnaphthalene. Component B5 has been prepared according to the procedure described for B1, but by using 62.1 weight percent of RAM™ 965 toughener, 0.9 weight percent of a latent EP 796 latent accelerator (available from Huntsman Corporation) (accelerator 2 or 13 of U.S. Pat. No. 4,713,432 (incorporated herein by reference), 9.6 weight percent of aminoethylpiperazine, 9.6 weight percent of LUPASOL™, polyethylenimine (available from BASF Corporation), 0.8 weight percent of AEROSIL™ fumed silica and 17.0 weight percent of diisopropylnaphthalene.

Viscosity

Figure 1:
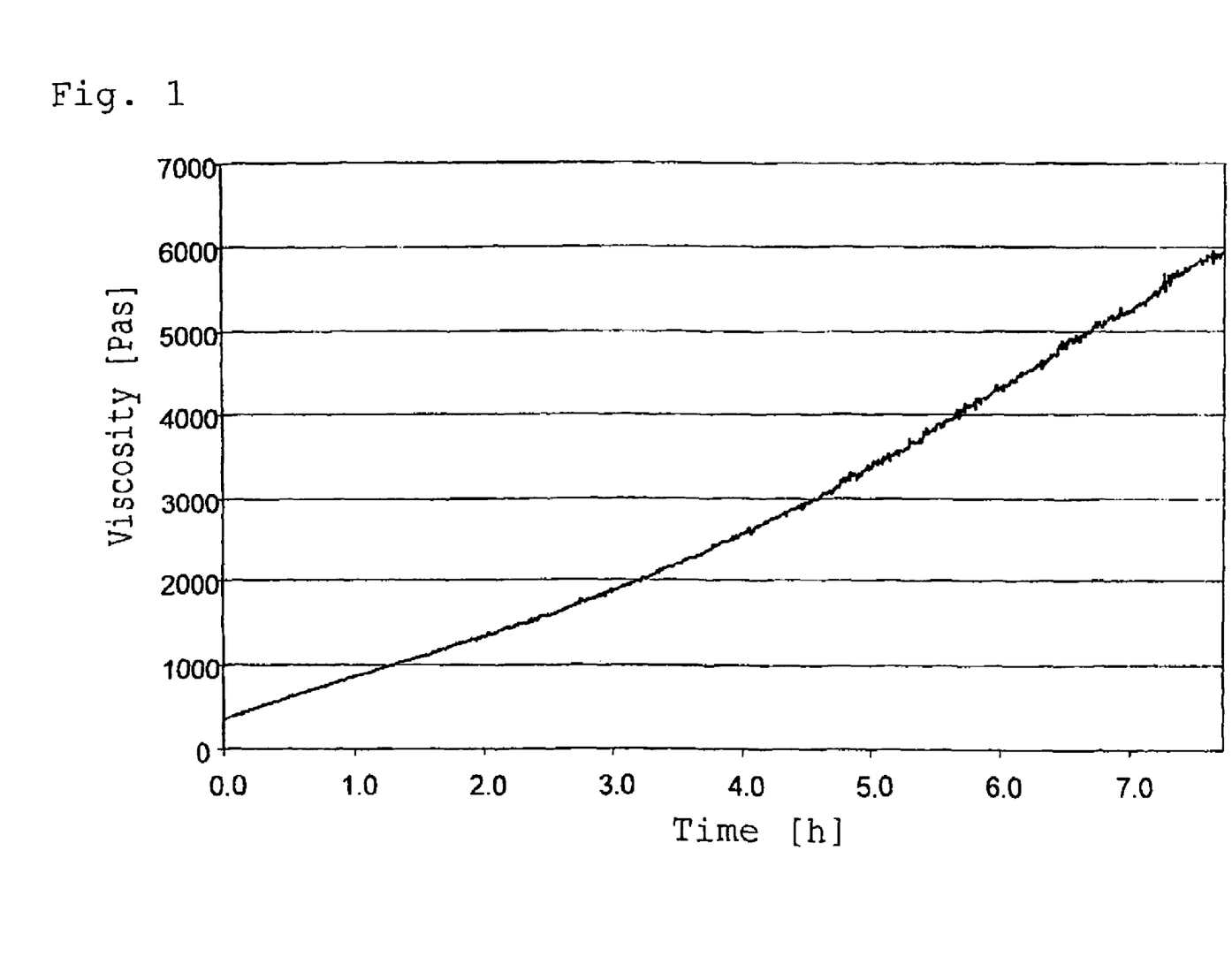
FIG. 1 is a plot of the viscosity of Formulation A5/B5 over time.
Figure 2:
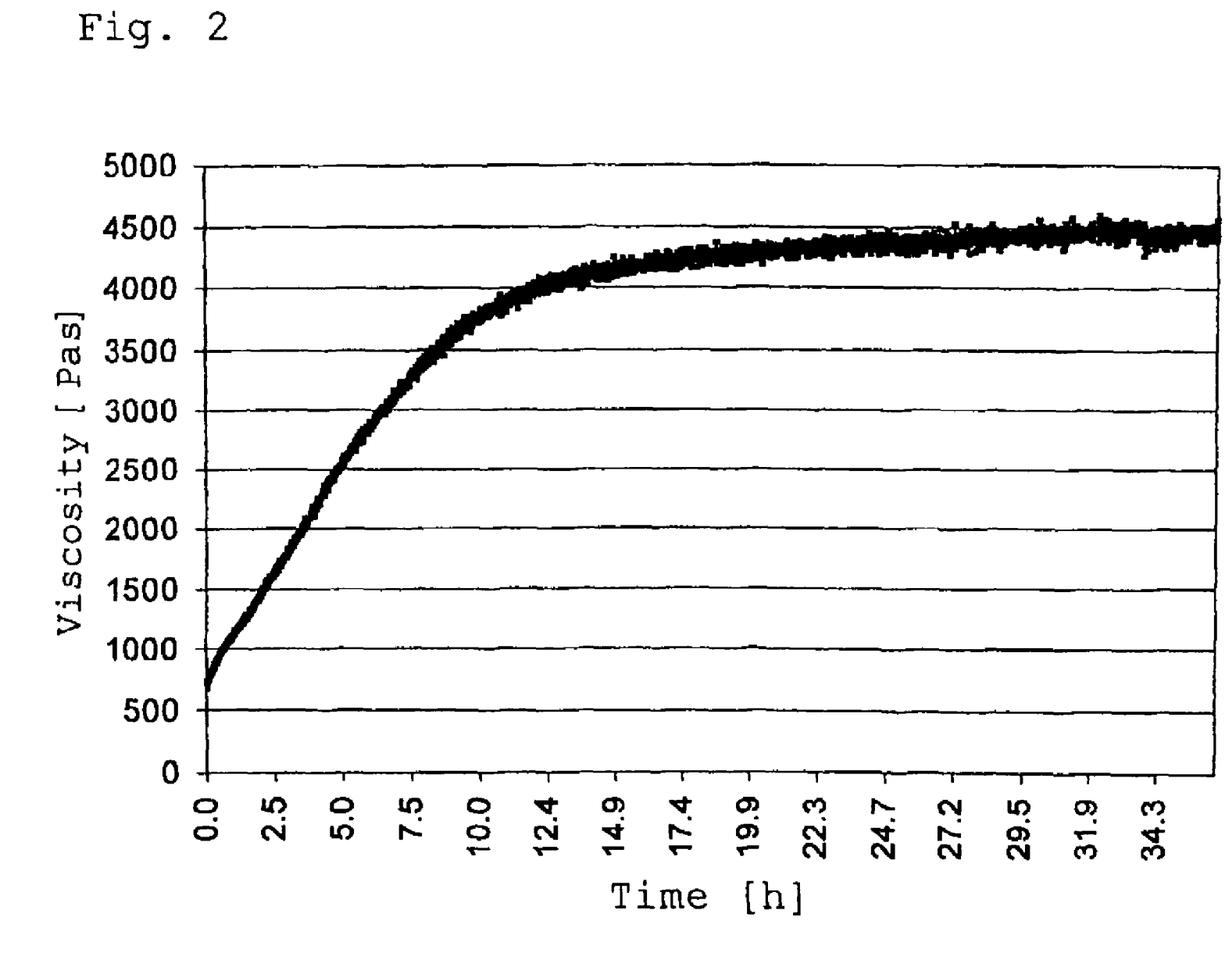
FIG. 2 is a plot of viscosity of Formulation A3/B2 over time.
Figure 3:
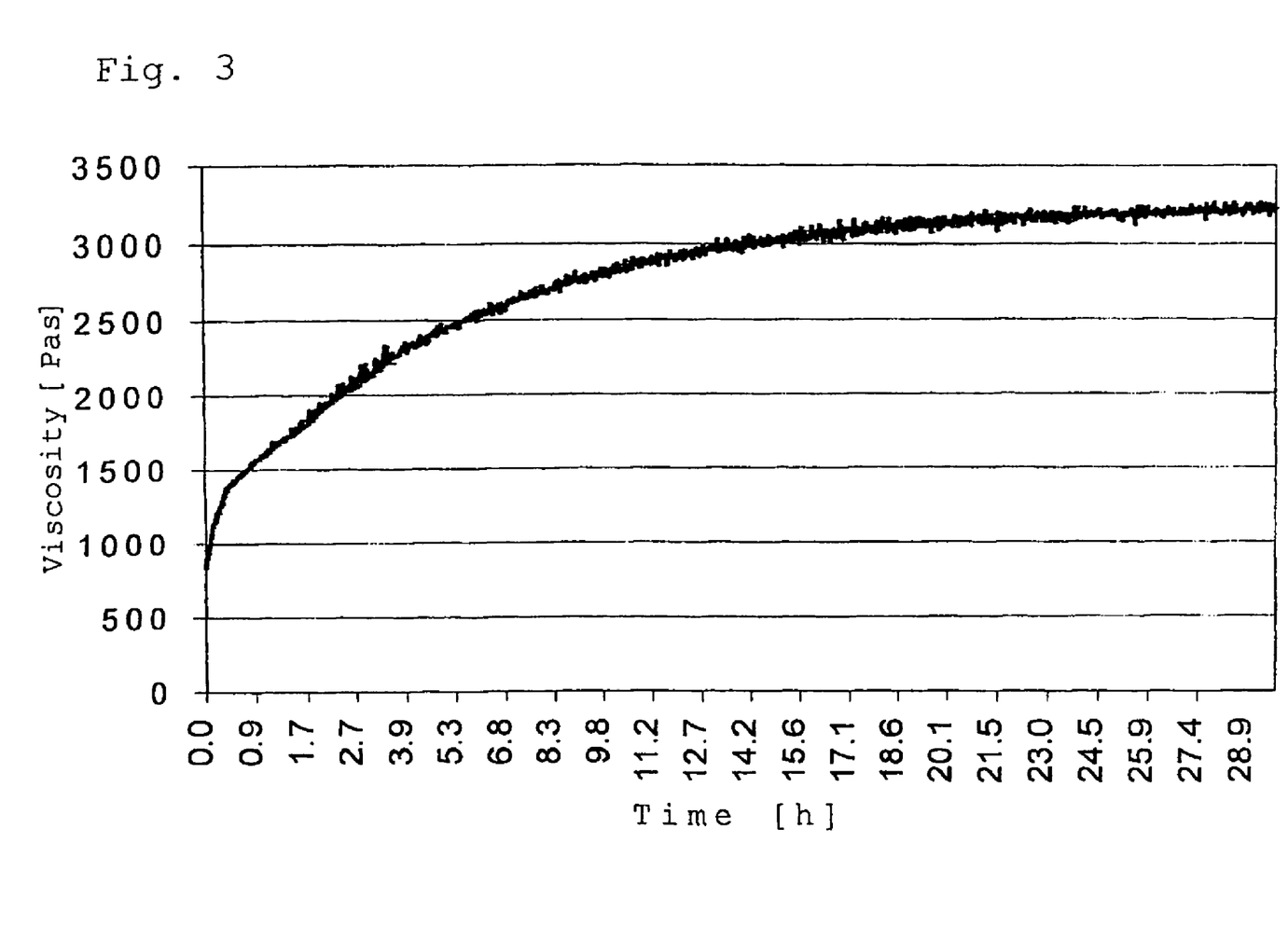
FIG. 3 is a plot of viscosity of Formulation A4/B4 over time.

After mixing component a) with component b), the viscosity was continuously measured at 23° C. by oscillation on a Bohlin rheometer (cone (4°)-plate) at a shear rate of 0.01. The viscosity increase for mixture A5/B5 (in a weight ratio of 2:1) over a term of 7 hours is shown in FIG. 1. The respective viscosity increase of mixture A3/B2 (weight ratio 10:1) over a term of about 30 hours and of mixture A4/B4 over a term of about 30 hours is shown in FIGS. 2 and 3, respectively.

Figure 4:
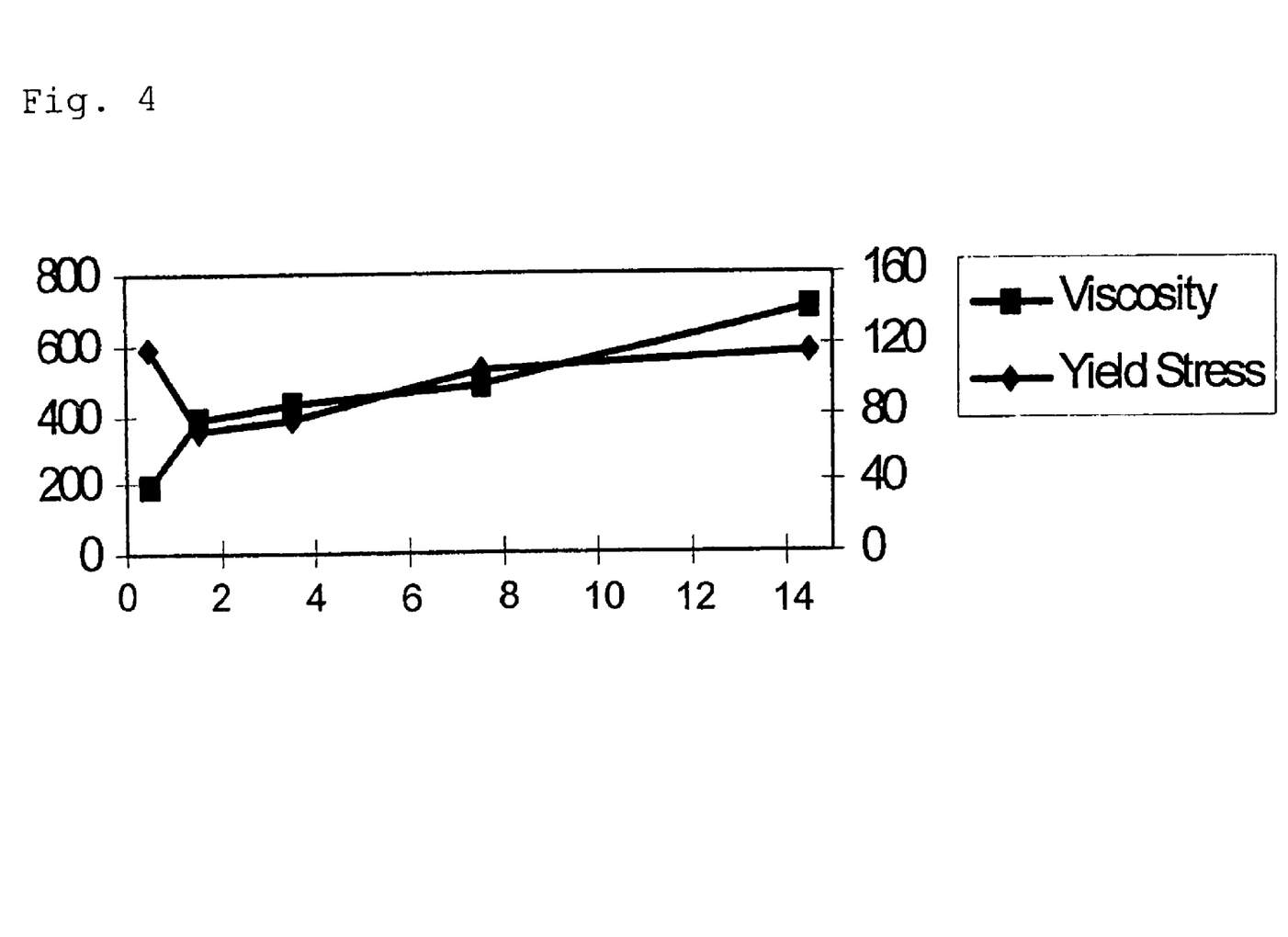
FIG. 4 is a plot of viscosities and yield stress against time for Formulation A3/B2.
Figure 5:
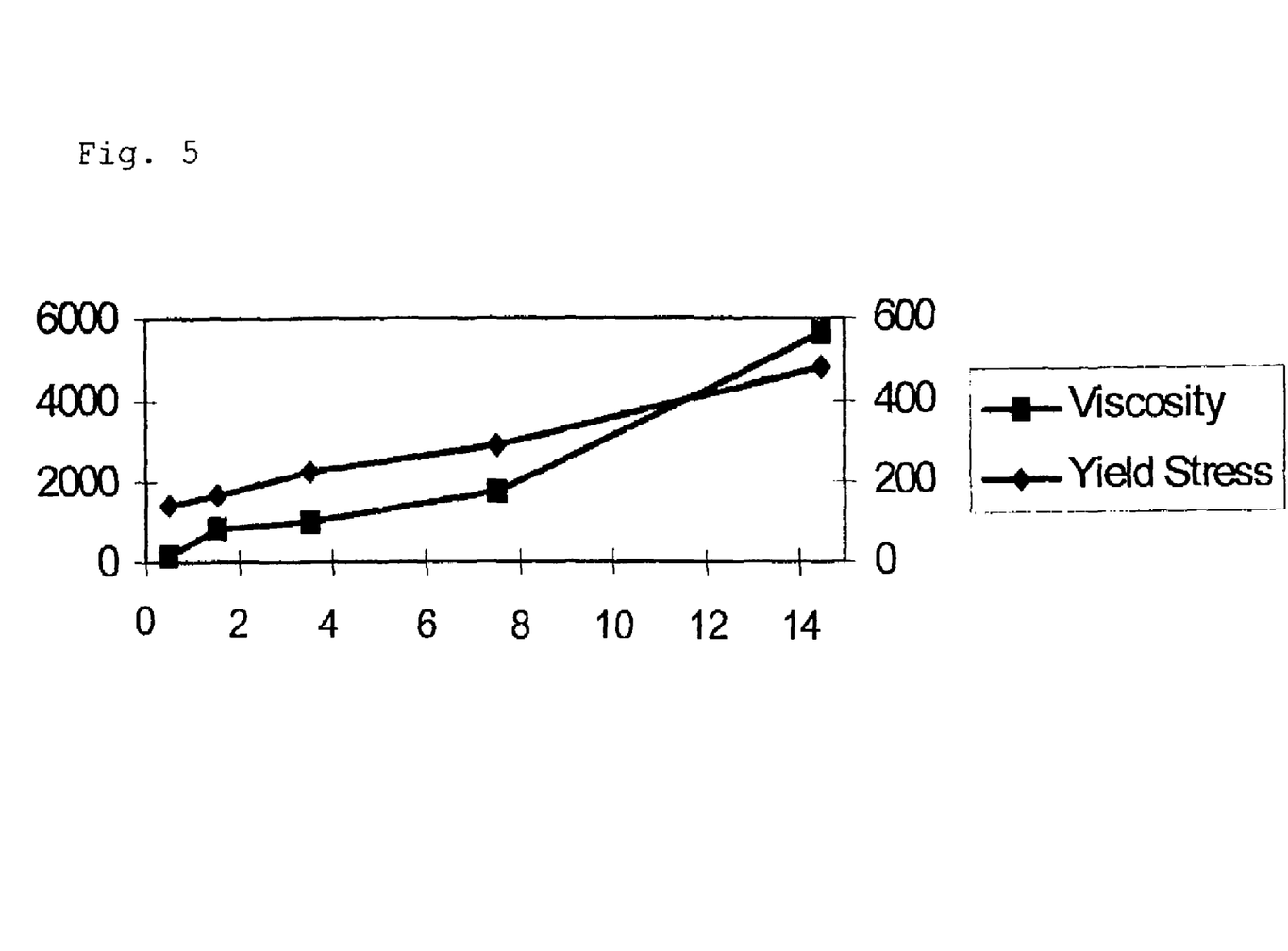
FIG. 5 is a plot of viscosity and yield stress over time for Formulation A4/B4.

Additionally, the viscosity and the yield stress after mixing the two components a) and b) was determined over a term of 14 days on a Bohlin rheometer (cone (4°)-plate) at room temperature and at a frequency of 0.1 to 20 $s^{-1}$. For the evaluation of the viscosity and the yield stress, the Casson model was applied. The corresponding results after 1 hour, 24 hours, 3 days, 8 days and 14 days are given in Table 1 for mixture A3/B2 and in Table 2 for mixture A4/B4. A graphical representation of these results is given in FIG. 4 for A3/B2 and in FIG. 5 for A4/B4 wherein the scale on the abscissa refers to the time in days, the scale on the left ordinate refers to the viscosity in Pa·s and the scale on the right ordinate refers to the yield stress in Pa.

TABLE 1

| Mixture A3/B2 | Viscosity [Pas] | Yield Stress [Pa] |
| --- | --- | --- |
| 1 hour | 188 | 118 |
| 24 hours | 381 | 69 |
| 3 days | 427 | 77 |
| 8 days | 479 | 105 |
| 14 days | 701 | 115 |

TABLE 2

| Mixture A4/B4 | Viscosity [Pas] | Yield Stress [Pa] |
| --- | --- | --- |
| 1 hour | 190 | 138 |
| 24 hours | 846 | 164 |
| 3 days | 960 | 229 |
| 8 days | 1754 | 289 |
| 14 days | 5649 | 487 |

Mechanical properties of the cured epoxy adhesive composition

Weight Ratio of Component a) to Component b): 10:1

Examples A1, A2 and A3 of component a) have been mixed with respective examples B1 and B2 of component b) in a weight ratio of 10:1. Thus, heat-curable epoxy adhesive compositions A1/B1, A2/B1 and A3/B2 have been prepared. After a duration specified in Table 1 (called "open time"), the composition has been heated to 180° C. for 30 minutes and thus subjected to final curing. The lap shear strength and the impact peel strength (on oily steel and on degreased steel) has been determined according to DIN EN 1465 and ISO 11343, respectively.

For measuring the lap shear strength, CRS 1403 (cold rolled steel), 1.5 mm was used as substrate.

For measuring the impact peel strength, CRS 140 (cold rolled steel), 3 1.0 mm was used as substrate.

The oil used in the tests was Anticorit 5012S oil.

In addition, for composition A3/B2 the glass transition temperature has been determined by differential scanning calorimetry (DSC) in the range of 25° C. to 180° C.

The results are given in Table 3. A graphical representation of the lap shear strength (shown as squares) and the impact peel strength (shown as triangles) for A3/B2 measured on oily steels is given in FIG. 6. A graphical representation of the lap shear strength (shown as squares) and the impact peel strength (shown as Rhombi) measured on oily steels for the A2/B1 combination is given in FIG. 7.

TABLE 3

| Lap shear strength (on oily steel) | Open time before curing | A1/B1 [MPa] | A2/B1 [MPa] | A3/B2 [MPa] |
| --- | --- | --- | --- | --- |
| | 1 d | 21 | 30 | 27 |
| | 7 d | 18 | 27 | 27 |
| | 14 d | 19 | 24 | 28 |
| | 21 d | 19 | 23 | 27 |
| Impact peel strength (on oily steel) | Open time before curing | A1/B1 [N/mm] | A2/B1 [N/mm] | A3/B2 [N/mm] |
| | 1 d | 40 | 30 | 30 |
| | 7 d | 36 | 33 | 27 |
| | 14 d | 33 | 28 | 27 |
| | 21 d | 28 | 27 | 26 |
| Impact peel strength (on degreased steel) | Open time before curing | A1/B1 [N/mm] | A2/B1 [N/mm] | A3/B2 [N/mm] |
| | 1 d | 42 | 33 | 30 |
| | 7 d | 36 | 33 | 27 |
| | 14 d | 38 | 28 | 27 |
| | 21 d | 30 | 29 | 26 |
| Glass trans. temp | | | | 90° C. |

Weight Ratio of Component a) to Component b): 2:1

Example A4 of component a) has been mixed with respective examples B3 and B4 of component b) in a weight ratio of 2:1. Thus, heat-curable epoxy adhesive compositions A4/B3 and A4/B4 have been prepared. After a duration specified in Table 2 (called "open time"), the composition has been subjected to final curing by heating it to 180° C. for 30 minutes. The lap shear strength and the impact peel strength (on oily steel and on degreased steel, respectively) has been determined according to DIN EN 1465 and ISO 11343, respectively.

For measuring the lap shear strength, CRS 1403 (cold rolled steel), 1.5 mm was used as substrate.

For measuring the impact peel strength, CRS 1403 (cold rolled steel), 1.0 mm was used as substrate.

The oil used in the tests was Anticorit 5012S oil.

In addition, for composition A4/B4 the glass transition temperature has been determined by differential scanning calorimetry (DSC) in the range of 25° C. to 180° C. The results are given in Table 4.

TABLE 4

| Lap shear strength (on oily steel) | open time before curing | A4/B3 [MPa] | A4/B4 [MPa] |
| --- | --- | --- | --- |
| | 1 d | 26 | 28 |
| | 7 d | 26 | 28 |
| | 14 d | 26 | 26 |
| | 21 d | 20 | 26 |
| Impact peel strength (on oily steel) | open time before curing | A4/B3 [N/mm] | A4/B4 [N/mm] |
| | 1 d | 26 | 24 |
| | 7 d | 27 | 21 |
| | 14 d | 25 | 21 |
| | 21 d | 21 | 21 |
| Impact peel strength (on degreased steel) | open time before curing | A4/B3 [N/mm] | A4/B4 [N/mm] |
| | 1 d | 31 | 23 |
| | 7 d | 29 | 19 |
| | 14 d | 30 | 24 |
| | 21 d | 27 | 25 |
| Glass trans. Temp. | | | 81° C. |

Figure 6:
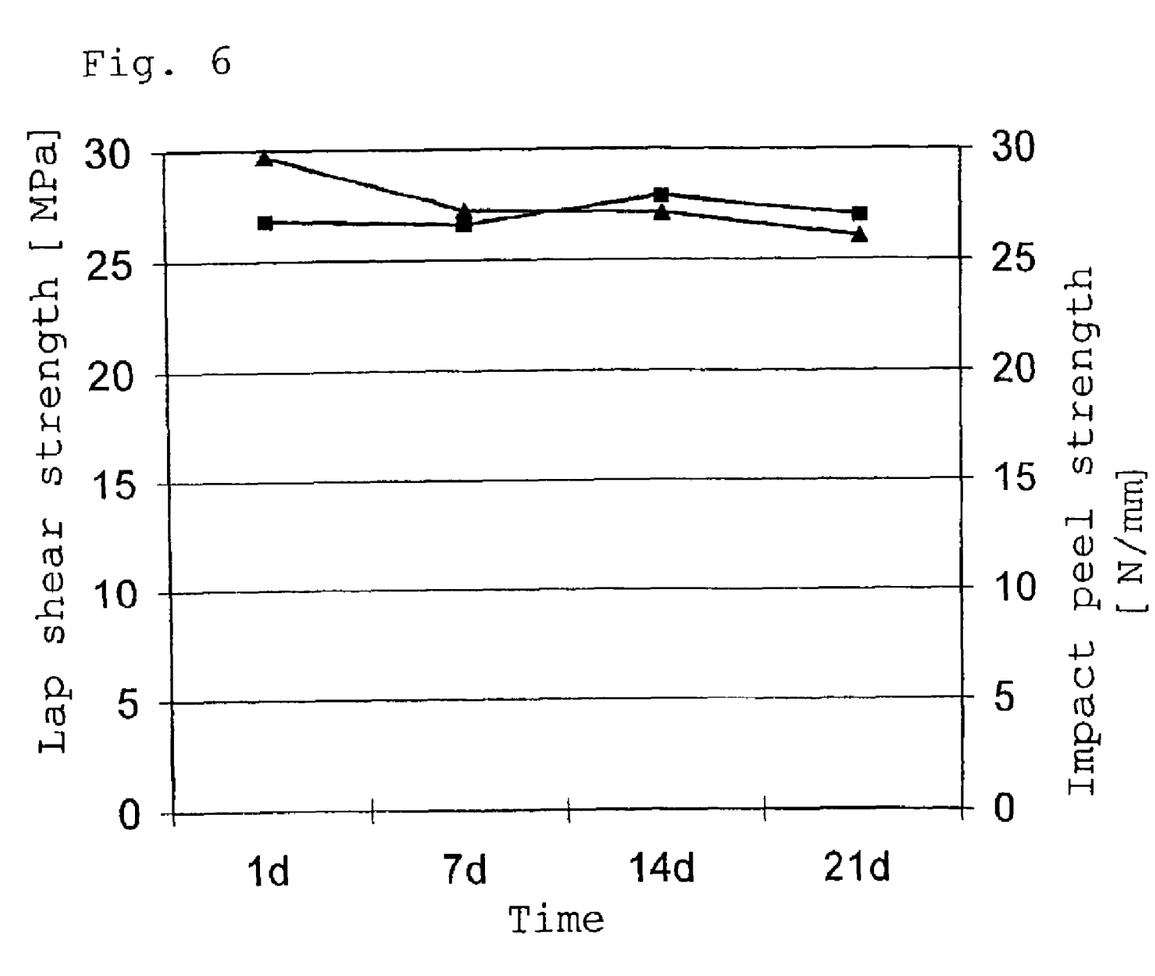
FIG. 6 is a plot of lap shear strength and impact peel strength over time for Formulation A3/B2.
Figure 7:
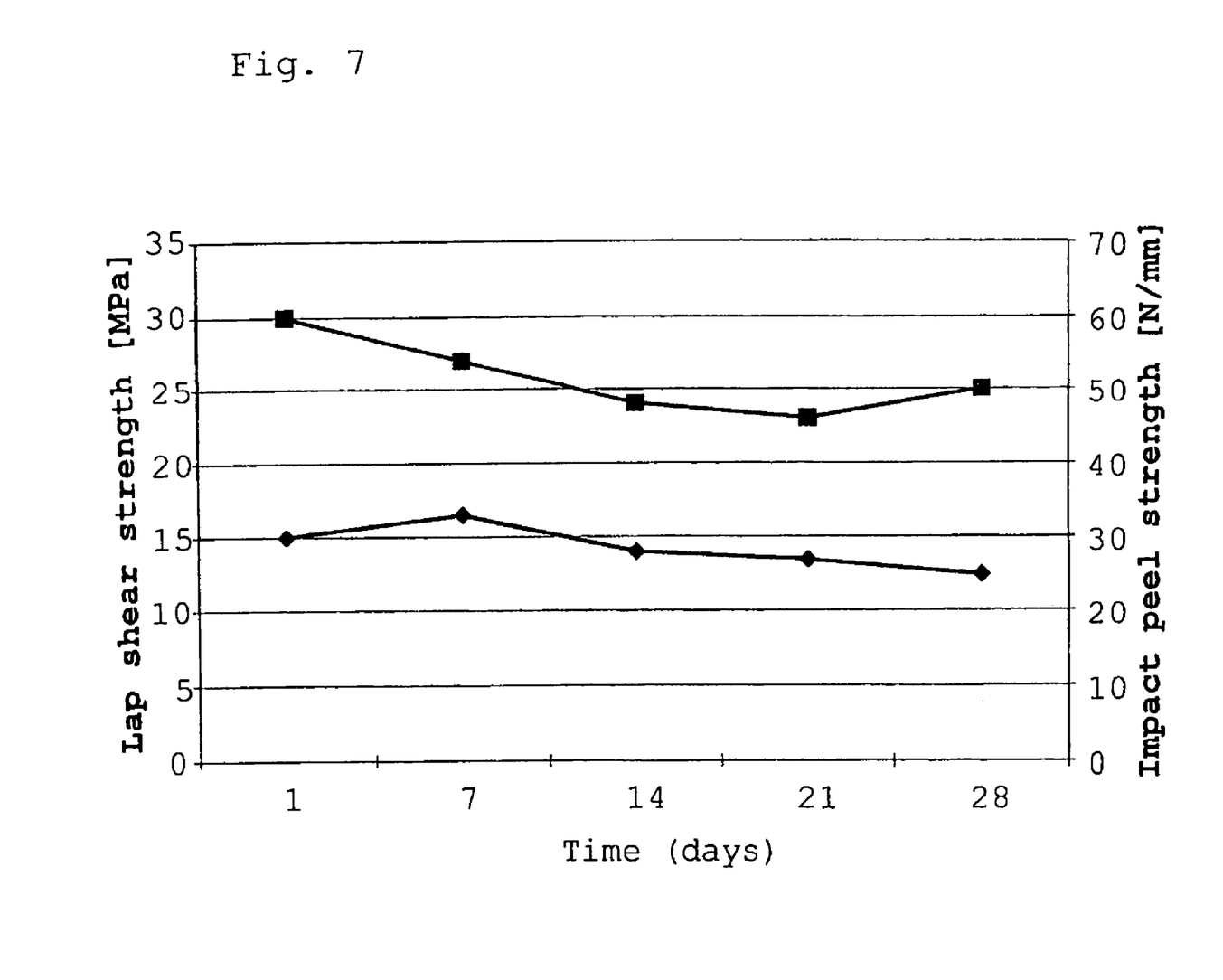
FIG. 7 is a plot of the lap shear strength and impact strength against time for Formulation A2/B1.

As can be seen from Table 3 and 4 and FIGS. 6 and 7, the cured epoxy adhesive compositions of the present invention have a lap shear strength of at least 18 MPa and an impact peel strength higher than 20 N/mm. The results of the impact peel strength measured on oily steels are comparable to the results measured on degreased steels.

Lap Shear Strength of the Non-cured Epoxy Adhesive Composition at Room Temperature In a further test, the lap shear strength of the 2:1 mixture A4/B4 without heat-curing was determined after 14 days, 21 days and 28 days at room temperature. The results are given in Table 5.

TABLE 5

| storage at 23° C. | lap shear strength (MPa) |
|---|---|
| 7 d | — |
| 14 d | <0.1 |
| 21 d | 0.2 |
| 28 d | 1.9 |

For the above mixture, a handling strength was detected after 21 days.

If an early wash-off resistance is required, the development of the lap shear strength can be accelerated by use of a tertiary amine, such as 2,4,6-tris(dimethylamino-methyl)phenol, as accelerator. This is illustrated by Table 6 showing the lap shear strength of the 2:1 mixture A5/B5 without heat-curing after 7 days and 14 days of storage at 23° C.

TABLE 6

| storage at 23° C. | lap shear strength (MPa) |
|---|---|
| 7 d | 7.1 |
| 14 d | 14.6 |

Lap Shear Strength of the Non-cured Epoxy Adhesive Composition after Induction Pre-curing In a further test, the above mixture was induction pre-cured. After applying the mixture to the substrate and assembling the substrates, the temperature was raised during 10 seconds from room temperature to 130° C. and 140° C., respectively, and held at these temperatures for 30 seconds.

The results of the measurement of the lap shear strength are shown in Table 7. CRS 1403 (cold rolled steel), 1.5 mm was used as substrate. The oil used in the tests was Anticorit 5012S oil.

TABLE 7

| pre-curing temperature | lap shear strength (MPa) |
|---|---|
| 130° C. | 0.3 |
| 140° C. | 1.4 |

The invention claimed is:

1. A two-component epoxy adhesive composition comprising
   a) a first component comprising a first epoxy resin and a second epoxy resin, the second epoxy resin being flexibilized by an elastomer, and
   b) a second component comprising at least one amine compound with one or more primary and/or secondary amino groups, said amine compound having a molecular weight of less than about 450 g/mol, wherein the weight ratio of the first component a) to the second component b) is from about 2:1 to about 10:1, the ratio of the total number of amino groups of the amine compound to the total number of epoxy groups of the epoxy resins is about 0.06:1 to about 0.2:1, and the reaction of the two components a) and b) after mixing results in a wash-off resistant composition, said wash-off resistant composition resulting upon heat-curing in a crash-stable structural adhesive.

2. A composition according to claim 1, wherein the amine compound is selected from the group consisting of 4,7,10-trioxatridecan-1,13-diamine, diethylenetriamine, triethylenetetramine tetraethylenepentamine, aminoethylpiperazine, polyetherdiamines and polyethertriamines.

3. A composition according to claim 2, wherein at least one of the two components a) and b) comprises a toughener.

4. A composition according to claim 3, wherein the toughener is selected from the group consisting of compounds of Formula I wherein m is 1 or 2, n is 2 to 6, $R^1$ is an n-valent radical of an elastomeric prepolymer after the removal of the terminal isocyanate, amino or hydroxyl group, the elastomeric prepolymer being soluble or dispersible in epoxy resin, W and X are independently —O— or —NR$^3$—, at least one of W and X being —NR$^3$—, $R^2$ is an m+1-valent radical of a polyphenol or aminophenol after the removal of the phenolic hydroxyl group and optionally of the amino group, and $R^3$ is hydrogen, a $C_1$-$C_6$ alkyl or phenol, and compounds of Formula II wherein p is 1 or 2, q is 2 to 6, Y is —O—, —S— or NR$^6$—, Z is a radical selected from the group consisting of —OH, —NHR$^6$, —OCN, $R^4$ is a residue of a hydroxyl-, mercapto- or amino-terminated polyether prepolymer or of a hydroxyl-, mercapto- or amino-terminated prepolymeric, segmented polyester, polythioester or polyamid, $R^5$ is a carbocyclic aromatic or araliphatic p+1-valent radical with groups Z bonded directly to the aromatic ring, $R^6$ is hydrogen, $C_1$-$C_6$ alkyl or phenyl, and $R^7$ is methyl or hydrogen, or a mixture thereof.

5. A composition according to claim 1, wherein the elastomer flexibilizing the second epoxy resin is an acrylonitrile-butadiene rubber.

6. A composition according to claim 1, wherein at least one of the two components a) and b) comprises a latent hardener in a total amount of less than about 10 weight percent based on the total weight of the composition.

7. A composition according to claim 6, the latent hardener being dicyandiamide.

8. A composition according to claim 1, wherein the second component b) comprises a hydrophobic diluent.

9. A composition according to claim 1, wherein at least one of the two components a) and b) comprises one or more additives selected from the group of latent accelerators, adhesion promoters, epoxy silane, fumed silica, wetting agents and inorganic fillers.

10. A composition according to claim 1 wherein at least one of the two components a) and b) comprises at least one tertiary mono- or polyamine or a mixture thereof as accelerator, the tertiary mono- or polyamine being embedded in a polymer matrix if comprised in component a).

11. A composition according to claim 3, wherein
a) the first component comprises about 30 to about 80 weight percent of the first epoxy resin, about 5 to about 30 weight percent of the second epoxy resin and about 20 weight percent or less of the toughener,
b) the second component comprises about 1 to about 40 weight percent of the amine compound, about 10 to about 80 weight percent of the toughener and about 10 to about 30 weight percent of the hydrophobic diluent,
and at least one of the two components a) and b) comprises an inorganic filler, epoxy silane, a wetting agent, fumed silica, a latent hardener, a latent accelerator or a mixture thereof.

12. A wash-off resistant epoxy adhesive composition obtained by mixing the first component a) and the second component b) according to claim 1.

13. A wash-off resistant epoxy adhesive composition obtained by mixing the first component a) and the second component b) according to claim 1 and pre-curing the resulting mixture by thermal methods.

* * * * *